United States Patent
Sorrentino et al.

(10) Patent No.: US 9,853,790 B2
(45) Date of Patent: Dec. 26, 2017

(54) NODES AND METHODS FOR ALLOCATING REFERENCE SIGNAL PARAMETERS TO USER EQUIPMENTS

(71) Applicant: Telefonaktiebolaget L M Ericsson (Publ), Stockholm (SE)

(72) Inventors: Stefano Sorrentino, Solna (SE); Sara Sandberg, Luleå (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/786,250

(22) PCT Filed: May 2, 2013

(86) PCT No.: PCT/SE2013/050483
§ 371 (c)(1),
(2) Date: Oct. 22, 2015

(87) PCT Pub. No.: WO2014/178764
PCT Pub. Date: Nov. 6, 2014

(65) Prior Publication Data
US 2016/0112171 A1    Apr. 21, 2016

(51) Int. Cl.
*H04Q 7/00*       (2006.01)
*H04L 5/00*       (2006.01)
(Continued)

(52) U.S. Cl.
CPC ......... *H04L 5/0051* (2013.01); *H04B 7/0417* (2013.01); *H04L 5/0037* (2013.01); *H04W 72/042* (2013.01); *H04L 5/0094* (2013.01)

(58) Field of Classification Search
CPC ... H04L 5/0051; H04L 5/0037; H04L 5/0094; H04W 72/042; H04B 7/0417
(Continued)

(56) References Cited

U.S. PATENT DOCUMENTS 9,667,395 B2 *   5/2017   Jongren ............... H04L 5/0051
2010/0074343 A1 *   3/2010   Gaal ..................... H04L 27/261
                                                        375/259

(Continued)

OTHER PUBLICATIONS

International Search Report and Written Opinion dated Mar. 13, 2014 for International Application Serial No. PCT/SE2013/050483, International Filing Date—May 2, 2013 consisting of 13-pages.
(Continued)

*Primary Examiner* — Chuong T Ho
(74) *Attorney, Agent, or Firm* — Christopher & Weisberg, P.A.

(57) ABSTRACT

Embodiments described relate to a Resource Partitioning Node (RPN) associated with scheduling nodes and a method performed by the RPN for allocating reference demodulation reference signal (DMRS) parameters to user equipments (UE). The method comprises assigning a first partition of at least one type of DMRS parameters to the at least one UE of the first scheduling node and a second partition of the same type of DMRS parameters to the at least one UE of the second scheduling node, and signaling, to the first and the second scheduling node, the respective partition of the at least one type of DMRS parameter to be used by the respective at least one UE. A scheduling node and a method thereof are also described.

17 Claims, 8 Drawing Sheets

(51) Int. Cl.
*H04B 7/0417* (2017.01)
*H04W 72/04* (2009.01)

(58) Field of Classification Search
USPC .......................................... 370/329, 330, 328
See application file for complete search history.

(56) References Cited

U.S. PATENT DOCUMENTS

| | | | | |
|---|---|---|---|---|
| 2012/0052896 A1* | 3/2012 | Li | ................. | H04B 7/0413 455/509 |
| 2012/0300728 A1* | 11/2012 | Lee | ................. | H04J 13/16 370/329 |
| 2013/0114523 A1* | 5/2013 | Chatterjee | ............ | H04J 11/0053 370/329 |
| 2013/0215835 A1* | 8/2013 | Chen | ................. | H04W 72/0406 370/329 |
| 2013/0259098 A1* | 10/2013 | Sorrentino | .......... | H04L 27/2613 375/219 |
| 2013/0315212 A1* | 11/2013 | Sorrentino | .......... | H04W 72/082 370/336 |
| 2014/0211835 A1* | 7/2014 | Sorrentino | .......... | H04L 27/2613 375/219 |
| 2014/0211885 A1* | 7/2014 | Sorrentino | .......... | H04L 27/2613 375/296 |
| 2015/0312908 A1* | 10/2015 | Sorrentino | .......... | H04W 72/082 370/336 |
| 2016/0156444 A1* | 6/2016 | Sorrentino | .......... | H04L 27/2613 370/329 |
| 2016/0211959 A1* | 7/2016 | Jongren | ................. | H04L 5/0051 |

OTHER PUBLICATIONS

3GPP TSG RAN WG1 Meeting #66, Athens, Greece; Title: "Evaluation on Necessity of DMRS Enhancement under HetNet CoMP Scenarios", R1-112263, Source ZTE, Agenda Item: 6.5.5, Document for Discussion and Decision, XP050537419, 3rd Generation Partnership Project (3GPP), Mobile Competence Centre; 650, Route Des Lucioles; F-06921 Sophia-Antipolis Cedex; France, Aug. 22-26, 2011 consisting of 6-pages.

3GPP TSG RAN WG1 Meeting #68bis, Jeju, Korea; Title: "Summary of Email Discussion: [68-08] Details of RRC Configuration for UL DMRS Sequence and CS Hopping", R1-121027, Source: Ericsson, Document for Discussion and Decision, XP050600069, 3rd Generation Partnership Project (3GPP), Mobile Competence Centre; 650, Route Des Lucioles; F-06921 Sophia-Antipolis Cedex; France, Mar. 26-30, 2012 consisting of 4-pages.

3GPP TSG RAN WG1 Meeting #68bis, Jeju, Korea; Title: "Details About UL DMRS Configuration and Signalling", R1-121028, Source: Ericsson, ST-Ericsson, Agenda Item: 7.5.6.1.1, Document for Discussion and Decision, XP050599268, 3rd Generation Partnership Project (3GPP), Mobile Competence Centre; 650, Route Des Lucioles; F-06921 Sophia-Antipolis Cedex; France, Mar. 26-30, 2012 consisting of 5-pages.

3GPP TSG RAN WG1 Meeting #68bis, Jeju, Korea; Title: "Signaling Design of DMRS for UL CoMP", R1-121596, Source KDDI, Agenda Item: 7.5.6.1.1, Document for Discussion and Decision, XP050599859, 3rd Generation Partnership Project (3GPP), Mobile Competence Centre; 650, Route Des Lucioles; F-06921 Sophia-Antipolis Cedex; France, Mar. 26-30, 2012 consisting of 7-pages.

3GPP TSG RAN WG1 Meeting #71, New Orleans, USA; Title: "Remaining Details of Downlink Control Signalling for DL CoMP", R1-125250, Source ZTE: Agenda Item: 6.2.2.3., Document for Discussion and Decision, XP050663105, 3rd Generation Partnership Project (3GPP), Mobile Competence Centre; 650, Route Des Lucioles; F-06921 Sophia-Antipolis Cedex; France, Nov. 12-16, 2012 consisting of 7-pages.

* cited by examiner

NODES AND METHODS FOR ALLOCATING REFERENCE SIGNAL PARAMETERS TO USER EQUIPMENTS

TECHNICAL FIELD

The present disclosure relates to allocation of Reference Signals to User Equipments, UEs, and in particular to allocation of Demodulation Reference Signals, DMRSs, to UEs being served by different scheduling nodes.

BACKGROUND

New mechanisms for UE specific assignments of uplink demodulation reference signal, DMRS have been standardised in the $3^{rd}$ Generation Partnership Project, 3GPP, Long Term Evolution, LTE Release-11. This enables DMRS coordination to achieve UpLink, UL, DMRS orthogonality between UEs belonging to different cells or scheduling nodes. By coordinating the DMRS parameters, inter-cell DMRS interference may be reduced.

However, inter-cell coordination requires fast connection, corresponding to low backhaul latency, between scheduling nodes implementing coordination of DMRS parameters. Such requirement may be infeasible for many deployments characterized by too high backhaul latency and/or jitter.

Another hinder to DMRS coordination is scheduler complexity, where scheduling decisions need to be jointly determined among the coordinated scheduling nodes. Scheduling is a complex task even without DMRS coordination, and adding such requirements increases complexity considerably.

SUMMARY

The object is to obviate at least some of the problems outlined above. In particular, it is an object to provide a Resource Partitioning Node, RPN, associated with at least a first and a second scheduling node and a method performed by the RPN for allocating Demodulation Reference Signal, DMRS, parameters to at least one User Equipment, UE, of the first scheduling node and to at least one UE of the second scheduling node. It is also an object to provide a scheduling node and a method performed by the scheduling node for allocating DMRS parameters to at least one UE. These objects and others may be obtained by providing an RPN and a scheduling node and a respective method performed by an RPN and a scheduling node according to the appended independent claims.

According to an aspect, a method performed by an RPN for allocating DMRS parameters to at least one UE of a first scheduling node and to at least one UE of a second scheduling node, wherein the RPN is associated with at least the first and the second scheduling node is provided. The method comprises assigning a first partition of at least one type of DMRS parameters to the at least one UE of the first scheduling node and a second partition of the same type of DMRS parameters to the at least one UE of the second scheduling node, and signaling, to the first and the second scheduling node, the respective partition of the at least one type of DMRS parameter to be used by the respective at least one UE.

According to an aspect, a method performed by a scheduling node for allocating DMRS parameters to at least one UE of the scheduling node is provided. The method comprises receiving, from an RPN, a partition of at least one type of DMRS parameters to be used by the at least one UE for configuring DMRSs; and signaling, to the at least one UE, a DMRS configuration associated with the received partition of the at least one type of DMRS parameters to be used for configuring DMRSs.

According to an aspect, an RPN associated with at least a first and a second scheduling node, the RPN being adapted for allocating DMRS parameters to at least one UE of the first scheduling node and to at least one UE of the second scheduling node is provided. The RPN comprises an assigning unit adapted for assigning a first partition of at least one type of DMRS parameters to the at least one UE of the first scheduling node and a second partition of the same type of DMRS parameters to the at least one UE of the second scheduling node; and a signaling unit adapted for signaling, to the first and the second scheduling node, the respective partition of the at least one type of DMRS parameter to be used by the respective at least one UE.

According to an aspect, a scheduling node adapted for allocating DMRS parameters to at least one UE of the scheduling node is provided. The scheduling node comprises a receiving unit adapted for receiving, from an RPN, a partition of at least one type of DMRS parameters to be used by the at least one UE for configuring DMRSs; and a signaling unit adapted for signaling, to the at least one UE, a DMRS configuration associated with the received partition of the at least one type of DMRS parameters to be used for configuring DMRSs.

The RPN, the method performed by the RPN, the scheduling node and the method performed by the scheduling node may have several advantages. They are of relatively low complexity and interference with regards to DMRSs of individual UEs may be reduced by making the DMRSs orthogonal. The different partitions may be semi-static so the RPN is enabled to change the partitioning if needed but is not required to continuously update or change the partitioning. They provide a possibility to do a trade-off between orthogonality and interference randomisation. UEs that experience high interference from other UEs in surrounding cells may be selected for a subset of UEs that are assigned limited DMRS parameters by the RPN and thereby benefit from DMRS orthogonality. Other UEs may experience better performance by exploiting interference randomisation and are therefore assigned DMRS parameters that may achieve full interference randomisation. A further advantage may be that no fast backhaul is required since there is no need to coordinate the DMRS parameters for each subframe, which in LTE is every TTI of 1 ms.

BRIEF DESCRIPTION OF DRAWINGS

Embodiments will now be described in more detail in relation to the accompanying drawings, in which.

DETAILED DESCRIPTION

Briefly described a RPN associated with at least a first and a second scheduling node and a method performed thereby for DMRS parameters to at least one User Equipment, UE, of the first scheduling node and to at least one UE of the second scheduling node are provided. Further, a scheduling node and a method performed thereby for allocating parameters to at least one UE of the scheduling node are provided. The RPN assigns different partitions of at least one type of DMRS parameters to UEs of the first scheduling node and to UEs of the second scheduling node, wherein the scheduling node informs the UEs served by the scheduling node of the DMRS parameters available to the UEs for generating DMRSs.

Figure 1A:
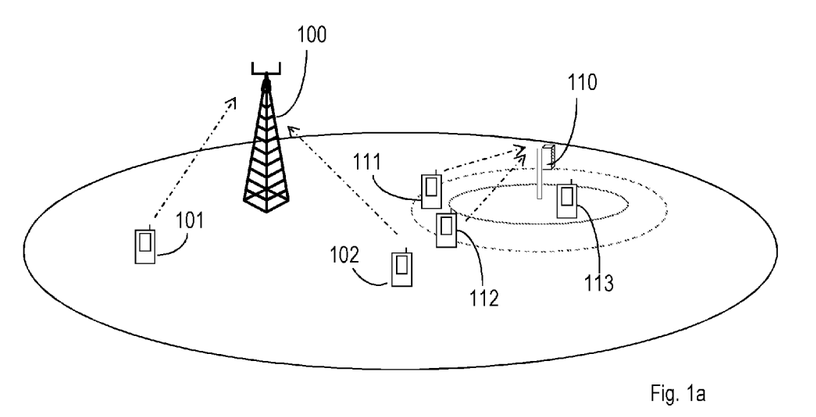
FIG. 1a illustrates a schematic example of a heterogeneous communication network comprising two scheduling nodes.

FIG. 1a illustrates a schematic example of a heterogeneous communication network comprising two scheduling nodes, a macro Radio Base Station, RBS, 100 and a low power RBS 110 which are network nodes. The macro RBS 100 is serving, or connected to, UE 101 and UE 102. The low power RBS 110 is serving, or connected to, UE 111, UE 112 and UE 113. In this simplified schematic example, UE 102 may cause interference to the UEs 111 and 112, and vice versa. Hence, in order to minimise the interference to the reference signals, especially the DMRSs, of the respective UEs, different DMRS values of at least one type of DMRS parameters may be used by UE 102 and the group comprising UE 111 and UE 112. In this manner, the mutual interference between UE 102 and the group comprising UE 111 and UE 112 with regard to the reference signals, especially the DMRSs, may be reduced. The values of the at least one type of DMRS parameters which may be used by UE 102 and the values of the at least one type of DMRS parameters which may be used by UE 111 and UE 112 may be selected such that the DMRSs of UE 102 are orthogonal to the DMRSs of UE 111 and UE 112.

Figure 1B:
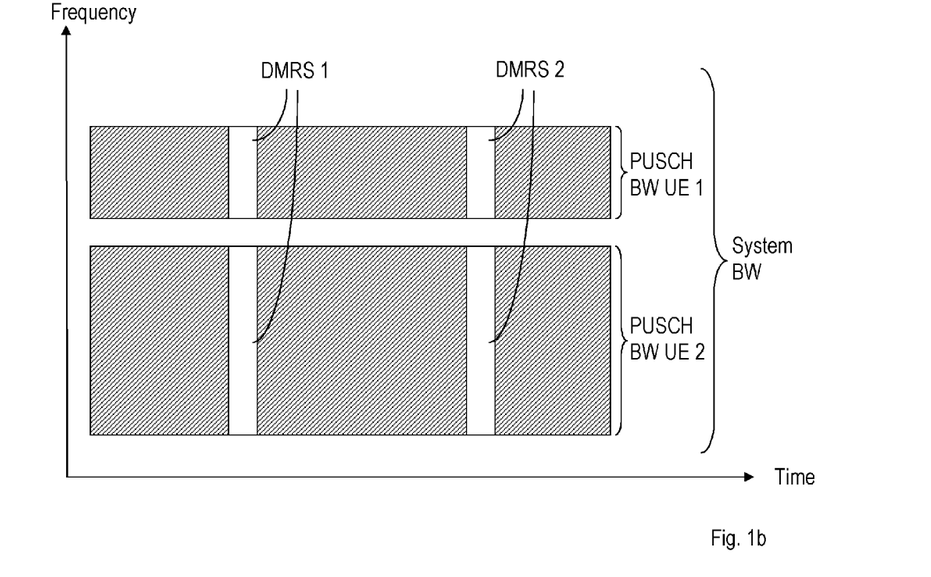
FIG. 1b is an illustration of an example where two UEs have different Physical Uplink Shared Channel, PUSCH, bandwidths.

FIG. 1b is an illustration of an example where two UEs have different Physical Uplink Shared Channel, PUSCH, bandwidths and orthogonality through Cyclic Shift, CS, is not possible. As described above, there are different measures that may be taken in order to achieve orthogonality between DMRSs of two individual UEs. One example of such a measure is CS. However, CS requires that the PUSCH bandwidths of the two individual UEs are the same. In FIG. 1b, a first UE denoted UE 1 has a smaller bandwidth than a second UE denoted UE 2. In order to achieve orthogonality between the DMRSs of these two UEs other measures may be taken, e.g. the two UEs have the same CSH pattern, different OCCs and SGH should be disabled.

Embodiments of a method performed by an RPN for allocating DMRS parameters to at least one UE of a first scheduling node and to at least one UE of a second scheduling node, wherein the RPN is associated with at least the first and the second scheduling node will now be described with reference to FIG. 2a.

Figure 2A:
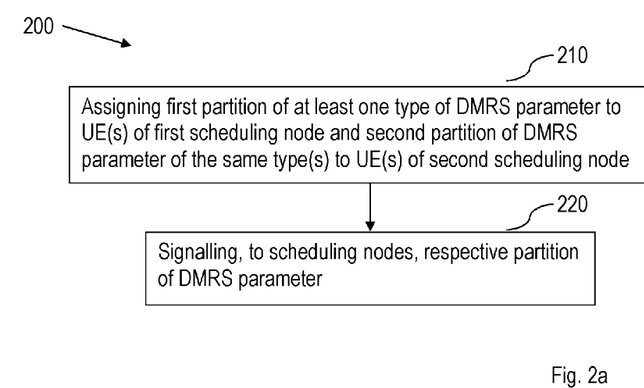
FIG. 2a is a flowchart of a method performed by a Resource Partitioning Node, RPN, according to an exemplifying embodiment.

FIG. 2a illustrates the method comprising assigning 210 a first partition of at least one type of DMRS parameters to the at least one UE of the first scheduling node and a second partition of the same type of DMRS parameters to the at least one UE of the second scheduling node, and signaling 220, to the first and the second scheduling node, the respective partition of the at least one type of DMRS parameter to be used by the respective at least one UE.

The RPN is associated with at least two scheduling nodes. Some examples of a scheduling node are a Base Station, Radio Base Station, Node B, and evolved Node B. The scheduling node may further be a macro scheduling node or a low power scheduling node. The scheduling nodes may be located geographically such that they are neighbouring each other, and/or have at least partly overlapping coverage areas. By a coverage area is meant the coverage area, or cell, by a scheduling node in which uplink transmissions from UEs being served by different scheduling nodes may interfere. The RPN may further have knowledge about different UEs that are served by, or connected to, the scheduling nodes associated with the RPN. The knowledge of the UEs may pertain to e.g. physical location and/or radio channel conditions of the respective UEs. The RPN may be a scheduling node and hence a network node.

The RPN has control over the different types of DMRS parameters, wherein the different types of DMRS parameters are means for making DMRSs transmitted from two individual UEs orthogonal. In other words, by applying different values of at least one type of DMRS parameter to DMRSs of individual UEs, the DMRSs of the individual UEs are orthogonal or semi-orthogonal.

The RPN may use its knowledge of the UEs of the different scheduling nodes that are associated with the RPN and based on this knowledge assign a first partition of at least one type of DMRS parameters to the at least one UE of the first scheduling node and a second partition of the same type of DMRS parameters to the at least one UE of the second scheduling node.

Merely as an example, assume that the RPN is associated with three scheduling nodes and that the first scheduling node serves one UE (denoted UE1) that causes, and/or suffers from, interference with regard to one UE (denoted UE2) served by the second scheduling node. Assume further that UE2 further causes, and/or suffers from, interference with regard to one UE (denoted UE3) served by the third scheduling node, in addition to the interference between UE1 and UE2. Thus all three UEs, i.e. UE1, UE2 and UE3 all experience interference from at least one other UE served by other scheduling nodes. Since the RPN has knowledge about the UEs served by the scheduling nodes associated with the RPN, the RPN uses this knowledge (or information) to assign a first partition of at least one type of DMRS parameters to UE1 of the first scheduling node, a second partition of the same type of DMRS parameters to UE2 of the second scheduling node and a third partition of the same type of DMRS parameters to UE3 of the third scheduling node. In this manner, the RPN enables the UEs to generate and transmit DMRSs which are individually orthogonal, i.e. the DMRSs of UE1 are orthogonal to the DMRSs of UE2 and UE3, the DMRSs of UE2 are orthogonal to the DMRSs of UE1 and UE3, and the DMRSs of UE3 are orthogonal to the DMRSs of UE1 and UE2.

Once the RPN has assigned the respective partitions to respective UEs of respective scheduling nodes, the RPN signals the respective partition of the at least one type of DMRS parameter to be used by the respective at least one UE to the respective scheduling node. By signaling the different partitions to the respective scheduling nodes, the scheduling nodes are enabled to subsequently inform the respective UEs about which DMRS parameters are available for use when generating and transmitting DMRSs.

The different partitions may be semi-static so the RPN is both enabled to change the partitioning if needed but is not required to continuously update or change the partitioning. In an example, the different partitions are updated periodically, but remain constant for several subframes.

The method may have several advantages. It is of relatively low complexity and interference with regards to DMRSs of individual UEs may be reduced by making the DMRSs orthogonal. The different partitions may be semi-static so the RPN is enabled to change the partitioning if needed but is not required to continuously update or change the partitioning. It provides a possibility to do a trade-off between orthogonality and interference randomisation. UEs that experience high interference from other UEs in surrounding cells may be selected for a subset of UEs that are assigned limited DMRS parameters by the RPN and thereby benefit from DMRS orthogonality. Other UEs may get better performance by exploiting interference randomisation and are therefore assigned DMRS parameters that may achieve full interference randomisation. A further advantage may be that no fast backhaul is required since there is no need to coordinate the DMRS parameters for each subframe, which in LTE is every TTI (Transmission Time Interval) of 1 ms.

According to an embodiment, the at least one type of DMRS parameters is comprised in the group of Orthogonal Cover Code, OCC, Cyclic Shift, CS, Cyclic Shift Hopping pattern index, CSH, Base Sequence Index, BSI, and Sequence and Group Hopping, SGH.

OCC is a multiplexing technique based on orthogonal time domain codes, operating on the two Reference Signals (RSs) provided for each UL subframe. Since only two OCC codes exist in 3GPP LTE, only two sets of orthogonal DMRS may be orthogonalised by OCC. The OCC code is signaled as part of the UL scheduling grants.

Cyclic Shift, CS, is a method to achieve orthogonality based on cyclic time shifts among RSs generated from the same base sequence. In the 3GPP LTE Release-12, equally spaced CS values are defined, out of which 8 different CS values can be signaled by scheduling grants. Even though CS is effective in multiplexing RSs assigned to fully overlapping bandwidths, orthogonality is lost when the bandwidths differ and/or when the interfering UEs employ different base sequences. In order to increase interference randomization, a pseudo-random offset to the CS values is applied which is referred to as CSH. The CSH may be performed according to a given or predefined pattern, referred to as CSH pattern.

To create (or generate) the RSs (e.g. DMRSs) to be comprised in a subframe to be transmitted, a UE firstly generates a base sequence. A base sequence is defined by a group number (or index) and a sequence number (or index). In LTE, there are 30 different base sequence groups. The base sequences are denoted $\bar{r}_{u,v}(n)$. The base sequences are divided into groups, where $u \in \{0, 1, \ldots, 29\}$ is the group number and v is the base sequence number within the group, such that each group contains one base sequence (v=0) of each length $M_{sc}^{RS}=mN_{sc}^{RB}$, where $1 \leq m \leq 5$ and two base sequences (v=0, 1) each of length $M_{sc}^{RS}=mN_{sc}^{RB}$, where $6 \leq m \leq N_{RB}^{max,UL}$. In this disclosure, the set of $\{u, v\}$ is referred to as the Base Sequence Index, BSI. Consequently, the BSI determines a unique base sequence that is exploited for generation of RSs for, e.g. DMRS, PUCCH-RS (Physical Uplink Control Channel—RS) and SRS (Sounding Reference Signal). Even though the parameters that determine the sequence group number, u, and the number, v, within the group are typically assigned in a semi-static fashion, e.g. by means of Radio Resource Control (RRC) signaling, the instantaneous values of u and v may be a function of the slot index and/or subframe number. Such BSI randomisation may also be collectively referred to as sequence and/or group hopping, SGH.

According to an embodiment, assigning 210 the first and second partition of the at least one type of DMRS parameters to the respective UEs comprises assigning a first OCC to the at least one UE of the first scheduling node and a second OCC to the at least one UE of the second scheduling node, wherein the first and the second OCC are orthogonal.

In this embodiment, when the DMRS parameter is OCC, there may only be two partitions if there are only two OCC codes. In the 3GPP LTE, only two OCCs are defined and hence only two sets of orthogonal DMRS may be orthogonalised by OCC. However, should there be more than two OCC codes, e.g. four OCC codes, then four sets of orthogonal DMRS could be orthogonalised by OCC.

The method may further comprise assigning the same CSH pattern to both the at least one UE of the first scheduling node and to the at least one UE of the second scheduling node.

As described above, CS is effective in multiplexing RSs assigned to fully overlapping bandwidths, but orthogonality is lost when the bandwidths differ and/or when the interfering UEs employ different base sequences. In order to increase interference randomization, a pseudo-random offset to the CS values is applied, i.e. CSH. In 3GPP LTE Release-11, the possibility to configure the CSH pattern and the BSI in a UE-specific way by RRC signaling is introduced. Such flexibility allows for a number of applications. The combination of different BSI, CSH patterns and SGH may be exploited to achieve different trade-offs between interference randomization, DMRS capacity and orthogonality by CS and/or OCC. When employing OCC, the same CSH pattern must be applied to OCC-orthogonal UEs.

Assigning 210 the first and second partition of the at least one type of DMRS parameters to the respective UEs may further comprise assigning different BSIs to the at least one UE of the first scheduling node and to the at least one UE of the second scheduling node.

It shall be pointed out again that there may be more than two partitions, e.g. three or four, thus assigning the individual partitions may comprise assigning different BSIs to UE(s) of individual respective scheduling nodes. The BSI determines a unique base sequence that is exploited for generation of RSs for e.g. DMRS. The assigning of partitions is then done in such a way that the base sequences, defined by the BSIs, which are used to generate the DMRSs are assigned such that the DMRSs generated by and transmitted from the different UEs are individually orthogonal. In other words the DMRSs generated by and transmitted from UEs of one (e.g. the first) scheduling node are orthogonal to the DMRSs generated by and transmitted from UEs of another (e.g. the second or a third) scheduling node.

The method may further comprise disabling SGH for both the at least one UE of the first scheduling node and the at least one UE of the second scheduling node.

As explained above, different BSI may be used in order to achieve DMRSs transmitted from different UEs (served by different scheduling nodes) being orthogonal. The RPN may also assign the same CSH pattern as well as different BSI to all coordinated scheduling nodes, that is, all scheduling nodes associated to the same RPN. In order to achieve orthogonality through different OCCs, SGH must be disabled.

Figure 2B:
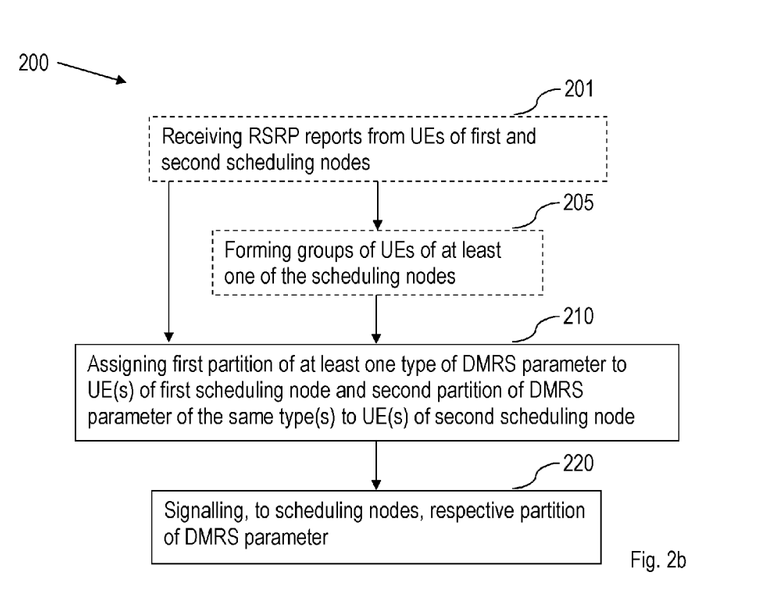
FIG. 2b is a flowchart of a method performed by an RPN according to yet an exemplifying embodiment.

According to an embodiment, the method further comprises forming 205 at least two groups of UEs of the first scheduling node, wherein assigning 210 the first and second partition of the at least one type of DMRS parameters to the respective UEs comprises assigning the first partition to one of the groups of UEs of the first scheduling node and assigning the second partition to the at least one UE of the second scheduling node, wherein the at least second group of UEs of the first scheduling node are assigned all available DMRS parameters of all available types.

This embodiment is illustrated in FIG. 2b. As stated above, each scheduling node may serve a plurality of UEs. In this embodiment, the first scheduling node has more than one UE being located within the coverage area, or cell, of the first scheduling node such that they cause and/or experience interference to/from at least one UE of a second scheduling node. Note again, that there may also be at least one UE of a third scheduling node and at least one UE of a forth scheduling node (and so on) which cause and/or experience interference to/from the other UEs of the other scheduling nodes. Assume for example that the RPN forms two groups of UEs of the first scheduling node, a first group of UEs causing/experiencing interference to UEs of the second scheduling node and a second group of UEs not causing/experiencing interference to UEs of the second scheduling node.

Thus, in this example, there are two groups of UEs being served by the first scheduling node, wherein the first group of UEs causing/experience interference to/from at least one UE of the second scheduling node. The RPN then assigns the first partition of at least one type of DMRS parameters to the first groups of UEs of the first scheduling node. The RPN further assigns the second partition of the same type of DMRS parameters to the at least one UE of the second scheduling node. Still further, the RPN assigns all available DMRS parameters of all available types to the second group of UEs of the first scheduling node. Since the second group of UEs of the first scheduling node does not cause/experience interference to UEs of the second scheduling node, there is no need to have the DMRSs of the UEs of the second group of UEs of the first scheduling node being orthogonal to UEs of the second scheduling node. Hence, the UEs of the second group of UEs of the first scheduling node may be free to use any of the available DMRS parameters of all types for generating and transmitting DMRSs. Of course, it shall be pointed out that there may be restrictions of which types of parameters that may be used on conjunction with other types of parameters due to their individual characteristics, which restrictions go beyond assigning partitions of DMRS parameters to different UEs and must always apply to the use of the DMRS parameters for generating DMRSs.

The method may further comprise receiving 201 Reference Signal Received Power, RSRP, reports from UEs of the first and the second scheduling nodes, wherein the assigning 210 the first and second partition of the at least one type of DMRS parameters to the respective UEs is based on the received RSRP reports.

As described above, the RPN has knowledge about different UEs that are served by, or connected to, the scheduling nodes associated with the RPN. The knowledge of the UEs may pertain to e.g. physical location and/or radio channel conditions of the respective UEs. In order for the RPN to obtain this knowledge, or information, the RPN receives RSRP reports from the UEs of the scheduling nodes with which the RPN is associated. The RSRP reports comprise measurement results of measurements performed by the UEs with regard to the transmission points of the scheduling nodes. In this manner, the RPN obtains information of where in a cell, i.e. a coverage area of a scheduling node, a UE is located and may determine if it experiences interference from UEs served by neighbouring scheduling nodes.

The RSRP reports may also be used by the RPN when forming 205 at least two groups of UEs of the first scheduling node as described above. In other words, the RPN forms at least two groups of UEs of the first scheduling node based on the RSRP measurement reports.

According to an embodiment, at least one scheduling node serves at least one Multiple Input Multiple Output, MIMO UE transmitting with rank >2, wherein the RPN treats each MIMO UE transmitting with rank >2 separately when assigning 210 the first and second partition of the at least one type of DMRS parameters to the respective UEs.

A MIMO UE which transmits with rank >2 may be assigned DMRS resources that do not comply with the assigned partition of at least one type of DMRS parameters. The reason is that MIMO performance benefits from assigning different layers (different ranks) of DMRS parameters to alternating OCC. Such benefits may exceed the benefit of orthogonality by OCC to interfering streams from other UEs. Hence, each MIMO UE transmitting with rank >2 is treated separately when assigning 210 the first and second partition of the at least one type of DMRS parameters to the respective UEs.

In an example, the RPN assigns different OCCs to every other scheduling node. As long as it is possible neighbouring scheduling nodes are assigned orthogonal OCCs. The RPN also assigns the same CSH pattern but different BSI to all coordinated schedulers, that is, to all scheduling nodes associated to this RPN. In order to achieve orthogonality through different OCCs, SGH should be disabled. This reduces the inter-cell interference randomisation for DMRS that are not orthogonal and thus potentially reduces the system performance. To achieve the best performance only UEs close to the cell-edge, that benefit much from DMRS orthogonality through OCC, are assigned the above respective partitions of the at least one type of DMRS parameters. Remaining UEs of each scheduling node may have DMRS parameters that achieve good interference randomisation.

Reverting to FIG. 1a, UE 101 may use a BSI denoted "BSI A" and a CSH denoted "CSH X". UE 101 further has SGH enabled. UE 101 does not cause and/or experience any, or only a little, interference to/from other UEs. Likewise, UE 113 may not cause and/or experience any, or only a little, interference to/from other UEs. However, UE 102 may cause and/or experience interference to/from UE 111 and UE 112. Hence, the DMRSs of UE 102 should be orthogonal to the DMRSs of UE 111 and UE 112. In order to achieve orthogonality between the DMRSs, UE 102 uses the BSI denoted BSI A, CSH X but SGH is disabled. UE 111 and UE 112 use a BSI denoted "BSI B" and the CSH denoted "CSH X" and have SGH disabled. Even if the BSI of UE 102 is different from the BSI of UE 111 and UE 112, the RPN may still, or in addition, partition the DMRS parameter OCC between the three UEs such that the RPN assigns a first partition of the OCC to UE 102 and a second partition of the OCC to UE 111 and UE 112.

Embodiments herein also relate to a method performed by a scheduling node for allocating DMRS parameters to at least one UE of the scheduling node. Such a method will now be described with reference to FIGS. 3a and 3b.

Figure 3A:
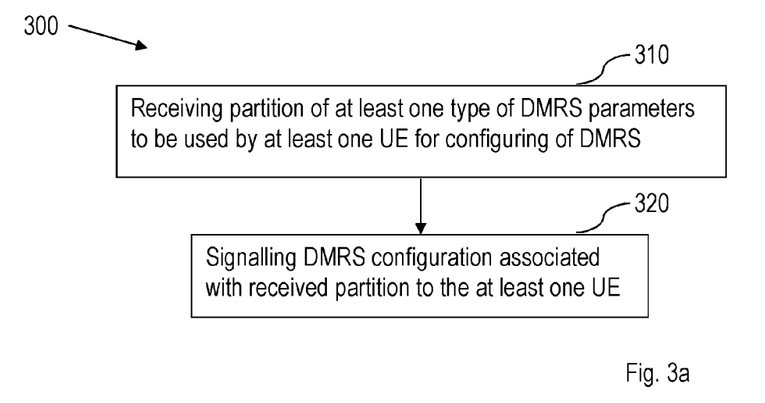
FIG. 3a is a flowchart of a method performed by a scheduling node according to an exemplifying embodiment.

FIG. 3a illustrates the method 300 comprising receiving 310, from an RPN, a partition of at least one type of DMRS parameters to be used by the at least one UE for configuring DMRSs; and signaling 320, to the at least one UE, a DMRS configuration associated with the received partition of the at least one type of DMRS parameters to be used for configuring DMRSs.

The scheduling node serves the at least one UE and receives a partition of at least one type of DMRS parameters from the RPN. The partition indicates a subset of values for at least one type of DMRS parameters that the at least one UE is allowed to use for generating DMRSs and subsequently transmitting the DMRSs in a subframe of an uplink transmission to the scheduling node. The partition of the at least one type of DMRS parameters are chosen by the RPN such that the DMRSs to be generated by and transmitted from the at least one UE are orthogonal to other UEs of other scheduling nodes which may otherwise interfere with, or be interfered by, the at least one UE. The scheduling node then signals, to the at least one UE, a DMRS configuration associated with the received partition of the at least one type of DMRS parameters to be used for configuring DMRSs. The DMRS configuration comprises information about e.g. values of different DMRS parameters that the UE should use when the UE generates the DMRSs which the UE subsequently inserts into a subframe, which is then transmitted in uplink to the scheduling node.

The method performed by the scheduling node has the same possible advantages as the method performed by the RPN since the scheduling node and the RPN are, so to say, working together in order to ascertain that different UEs of different scheduling nodes make use of the respective partitions of at least one type of DMRS parameters for generating and transmitting DMRSs. The method is of relatively low complexity and interference with regards to DMRSs of individual UEs may be reduced by making the DMRSs orthogonal. The different partitions may be semi-static so the RPN is enabled to change the partitioning if needed but is not required to continuously update or change the partitioning. It provides a possibility to do a trade-off between orthogonality and interference randomisation. UEs that experience high interference from other UEs in surrounding cells may be selected for a subset of UEs that are assigned limited DMRS parameters by the RPN and thereby benefit from DMRS orthogonality. Other UEs may get better performance by exploiting interference randomisation and are therefore assigned DMRS parameters that may achieve full interference randomisation. A further advantage may be that no fast backhaul is required since there is no need to coordinate the DMRS parameters for each subframe, which in LTE is every TTI of 1 ms.

Figure 3B:
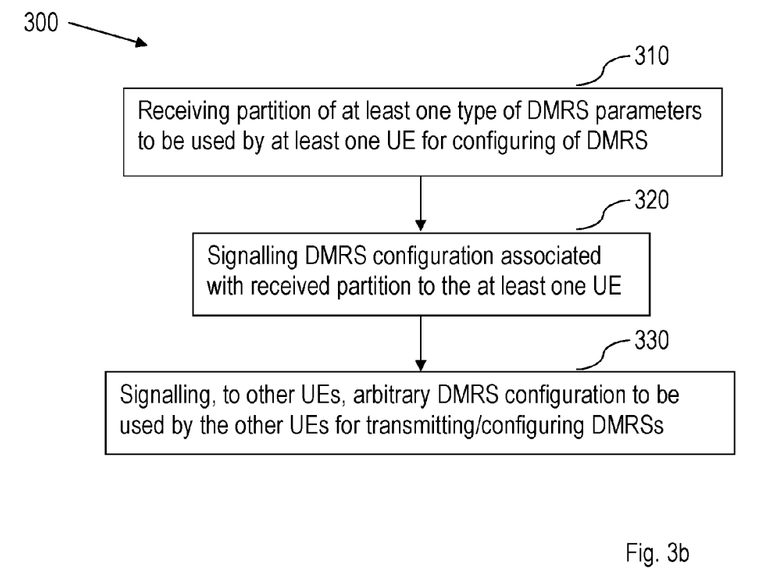
FIG. 3b is a flowchart of a method performed by the scheduling node according to still an exemplifying embodiment.

According to an embodiment, illustrated in FIG. 3b, the method further comprises transmitting 330, to other UEs of the scheduling node, arbitrary DMRS configurations to be used by the other UEs for configuring DMRSs, wherein the arbitrary DMRS configurations are not limited to the received partition of DMRS parameters.

The received partition of the at least one type of DMRS parameters to be used by the at least one UE should only be applied to the at least one UE. The partition may be seen as a restriction, or subset, of values for the DMRS parameters of the at least one type. Since other UEs served by the scheduling node do not cause and/or experience as much, or no, interference to/from UEs of other scheduling nodes than the at least one UE for which the partition is intended, those other UEs need not be restricted to use only the values for the DMRS parameters of the at least one type indicated in the partition. Thus the other UEs may be free to use all, or arbitrary, DMRS configurations when generating and subsequently transmitting DMRSs.

When scheduling UEs, each scheduling node limits the choice of DMRS resources to those allocated by the RPN. Each scheduling node may optimise the scheduling decision for, e.g., best performance, under the constraint that only the DMRS parameters assigned by the RPN in the partition may be allocated to the scheduled UEs. Each scheduling node does not need to be aware of the DMRS resources allocated to other scheduling nodes coordinated by the same RPN. The coordination performed by the RPN may be relatively "slow" compared to the backhaul latency, while scheduling decisions taken by each scheduling node is typically done on a TTI basis, i.e., on a time basis possibly shorter than the backhaul latency. The proposed resource partitioning can be seen as a hierarchical allocation where semi-static allocation is performed by the RPN and fast allocation is performed by the individual scheduling nodes.

Embodiments herein also relate to an RPN adapted for allocating DMRS parameters to at least one UE of the first scheduling node and to at least one UE of the second scheduling node. The RPN has the same technical features, objects and advantages as the method performed by the RPN. The RPN will hence only be described in brief in order to avoid unnecessary repetition. The RPN will be described with reference to FIG. 4a.

Figure 4A:
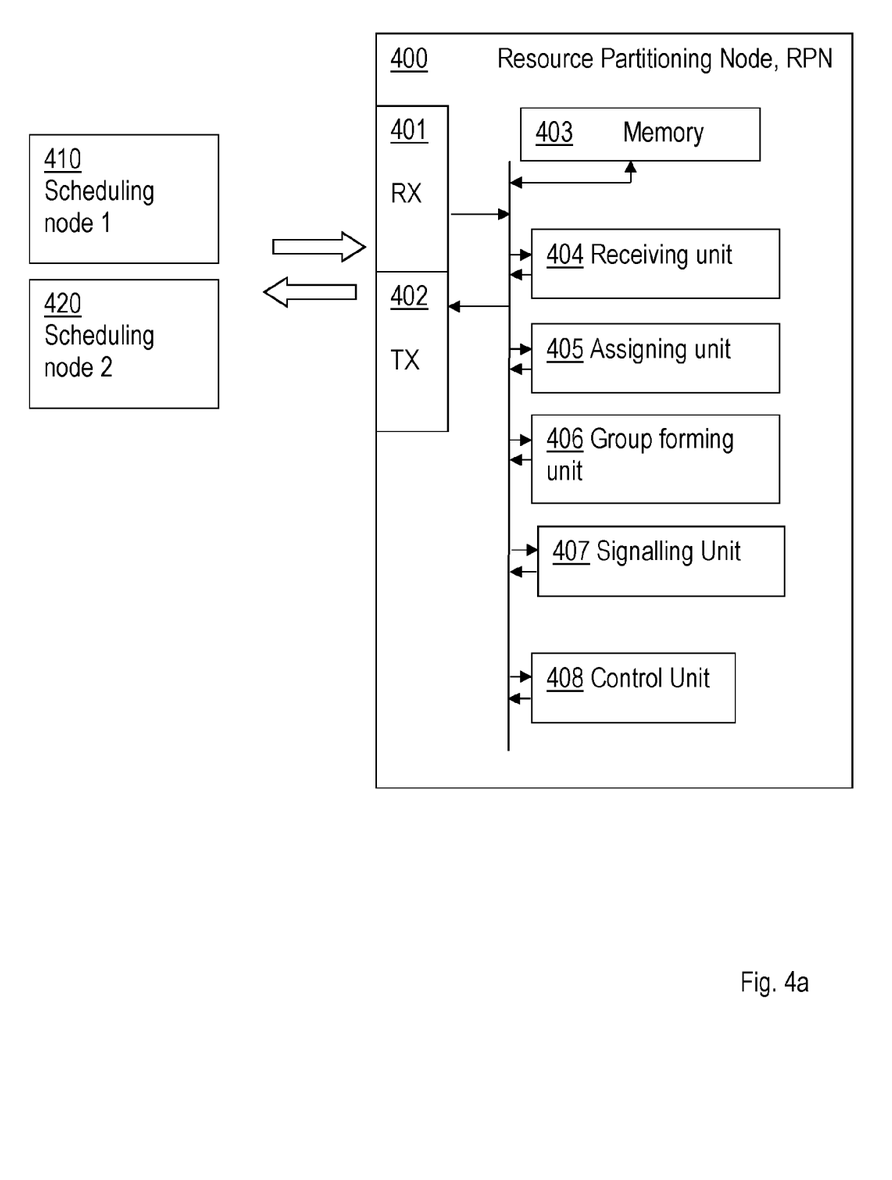
FIG. 4a is a block diagram of an RPN according to an exemplifying embodiment.

FIG. 4a illustrates the RPN 400 comprising an assigning 405 unit adapted for assigning a first partition of at least one type of DMRS parameters to the at least one UE of the first scheduling node and a second partition of the same type of DMRS parameters to the at least one UE of the second scheduling node; and a signaling unit 407 adapted for signaling, to the first and the second scheduling node, the respective partition of the at least one type of DMRS parameter to be used by the respective at least one UE.

The RPN has the same advantages as the method performed by the RPN. It is of relatively low complexity and interference with regards to DMRSs of individual UEs may be reduced by making the DMRSs orthogonal. The different partitions may be semi-static so the RPN is enabled to change the partitioning if needed but is not required to continuously update or change the partitioning. It provides a possibility to do a trade-off between orthogonality and interference randomisation. UEs that experience high interference from other UEs in surrounding cells may be selected for a subset of UEs that are assigned limited DMRS parameters by the RPN and thereby benefit from DMRS orthogonality. Other UEs may get better performance by exploiting interference randomisation and are therefore assigned DMRS parameters that may achieve full interference randomisation. A further advantage may be that no fast backhaul is required since there is no need to coordinate the DMRS parameters for each subframe, which in LTE is every TTI of 1 ms.

The at least one type of DMRS parameters may be comprised in the group of Orthogonal Cover Code, OCC, Cyclic Shift, CS, Cyclic Shift Hopping pattern index, CSH, Base Sequence Index, BSI, and Sequence and Group Hopping, SGH.

The assigning unit 405 may further be adapted for assigning the first and second partition of the at least one type of DMRS parameters to the respective UEs by assigning a first OCC to the at least one UE of the first scheduling node and a second OCC to the at least one UE of the second scheduling node, wherein the first and the second OCC are orthogonal.

In an example, the assigning unit 405 further is adapted for assigning the same CSH pattern to both the at least one UE of the first scheduling node and to the at least one UE of the second scheduling node.

According to an embodiment, the assigning unit 405 further is adapted for assigning the first and second partition of the at least one type of DMRS parameters to the respective UEs by assigning different BSIs to the at least one UE of the first scheduling node and to the at least one UE of the second scheduling node.

The assigning unit 405 may further be adapted for disabling SGH for both the at least one UE of the first scheduling node and the at least one UE of the second scheduling node.

In yet an example, the RPN further comprises a group forming unit 406 adapted for forming at least two groups of UEs of the first scheduling node, wherein the assigning unit 405 is adapted for assigning the first and second partition of the at least one type of DMRS parameters to the respective UEs by assigning the first partition to one of the groups of UEs of the first scheduling node and assigning the second partition to the at least one UE of the second scheduling node, wherein the assigning unit 405 is adapted for assigning, to the at least second group of UEs of the first scheduling node, all available DMRS parameters of all available types.

The RPN may further comprise a receiving unit 404 adapted for receiving Reference Signal Received Power, RSRP, reports from UEs of the first and the second scheduling nodes, wherein the assigning unit 405 is adapted for assigning the first and second partition of the at least one type of DMRS parameters to the respective UEs based on the received RSRP reports.

According to an embodiment, at least one scheduling node serves at least one MIMO UE transmitting with rank >2, wherein the RPN is adapted to treat each MIMO UE transmitting with rank >2 separately when the assigning unit 405 assigns the first and second partition of the at least one type of DMRS parameters to the respective UEs.

The RPN may be a logical or physical node. It may be implemented as a separate physical node or incorporated into a scheduling node. The RPN may further be incorporated into a node in a core network, e.g. an Operation and Maintenance node.

Figure 4B:
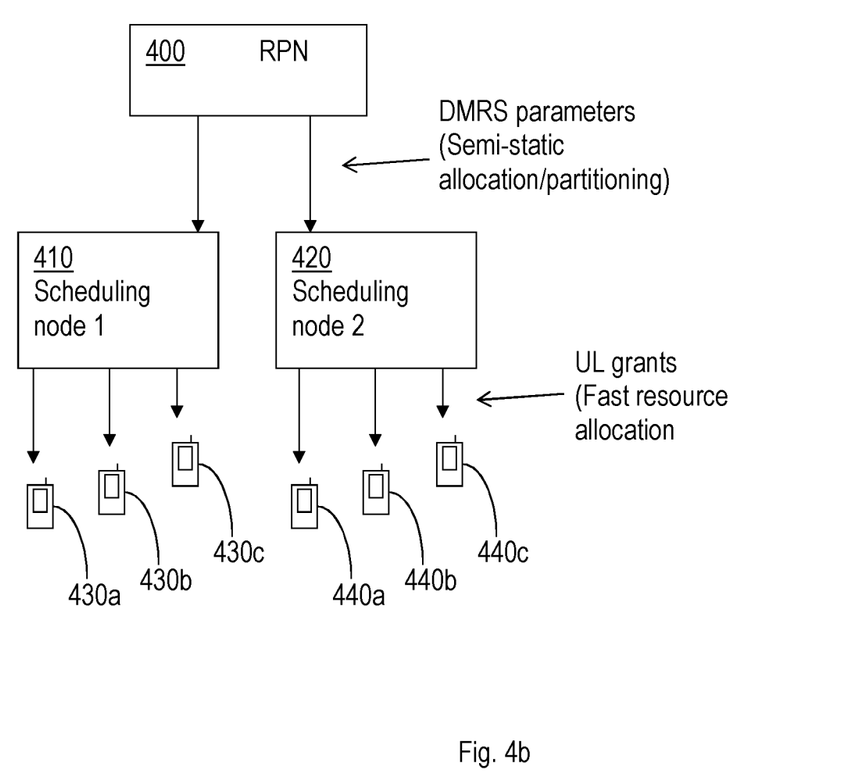
FIG. 4b is an illustration of an example of a hierarchical DMRS parameter partitioning network comprising RPN and scheduling nodes and UEs.

FIG. 4*b* is an illustration of an example of a hierarchical DMRS parameter partitioning network comprising an RPN.

The RPN 400 assigns the first and the second partitions of at least one type of DMRS parameters to the scheduling nodes 410 (the first scheduling node) and 420 (the second scheduling node). The first scheduling node 410 serves, or is connected to, UEs 430*a*, 430*b* and 430*c*. The second scheduling node 420 serves, or is connected to, UEs 440*a*, 440*b* and 440*c*. At least one of UEs 430*a*, 430*b* and 430*c* causes and/or experiences interference to/from at least one of UEs 440*a*, 440*b* and 440*c*. Hence the RPN assigns a first partition of at least one type of DMRS parameters to the at least one UE of the first scheduling node 410 and a second partition of the same type of DMRS parameters to the at least one UE of the second scheduling node 420. The RPN 400 signals the respective partition to respective scheduling node, which in turn signals respective DMRS configurations (based on respective DMRS partition) to the respective UE, e.g. in uplink grants.

Embodiments herein also relate to a scheduling node adapted for allocating DMRS parameters to at least one UE of the scheduling node. The scheduling node has the same technical features, objects and advantages as the method performed by the scheduling node. The scheduling node will hence only be described in brief in order to avoid unnecessary repetition. The scheduling node will be described with reference to FIG. 5.

Figure 5:
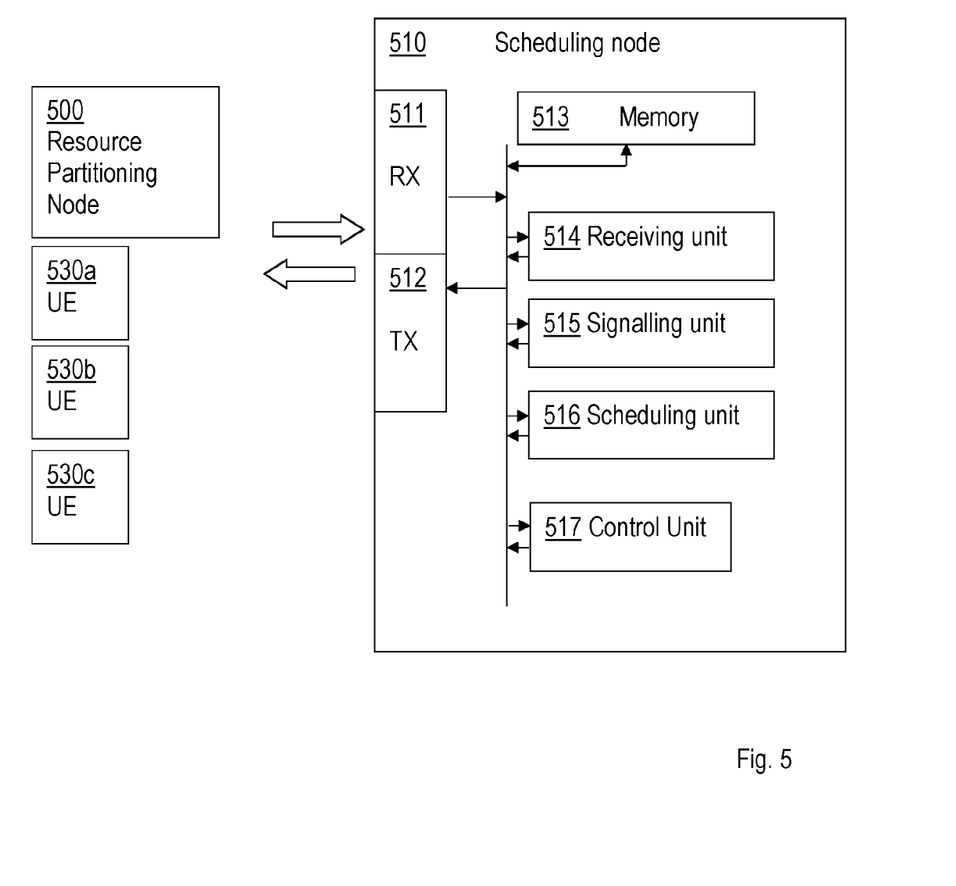
FIG. 5 is a block diagram of a scheduling node according to an exemplifying embodiment.

FIG. 5 illustrates the scheduling node comprising a receiving unit 514 adapted for receiving, from a Resource Partitioning Node 500, RPN, a partition of at least one type of DMRS parameters to be used by the at least one UE 530*a* for configuring DMRSs; and a signaling unit 515 adapted for signaling, to the at least one UE 530*a*, a DMRS configuration associated with the received partition of the at least one type of DMRS parameters to be used for configuring DMRSs.

The scheduling node has the same advantages as the method performed by the scheduling node. It is of relatively low complexity and interference with regards to DMRSs of individual UEs may be reduced by making the DMRSs orthogonal. The different partitions may be semi-static so the RPN is enabled to change the partitioning if needed but is not required to continuously update or change the partitioning. It provides a possibility to do a trade-off between orthogonality and interference randomisation. UEs that experience high interference from other UEs in surrounding cells may be selected for a subset of UEs that are assigned limited DMRS parameters by the RPN and thereby benefit from DMRS orthogonality. Other UEs may get better performance by exploiting interference randomisation and are therefore assigned DMRS parameters that may achieve full interference randomisation. A further advantage may be that no fast backhaul is required since there is no need to coordinate the DMRS parameters for each subframe, which in LTE is every TTI of 1 ms.

According to an embodiment, the signaling unit 515 further is adapted for signaling, to other UEs 530*b*, 530*c* of the scheduling node, arbitrary DMRS configurations to be used by the other UEs 530*b*, 530*c* for configuring DMRSs, wherein the arbitrary DMRS configurations are not limited to the received partition of DMRS parameters.

In an example of the DMRS parameter being OCC, and the network comprising a homogeneous network deployment, the RPN may partition the DMRS parameters of OCC such that every neighbouring scheduling node has different OCCs and every other neighbouring node has the same OCCs, if possible. In case the network comprises a heterogeneous network deployment, every other macro scheduling node has the same OCCs wherein every neighbouring macro scheduling node has different OCCs, if possible. Also every other low power scheduling node within the coverage area of a macro scheduling node are associated with a first set of low power scheduling nodes while the other low power scheduling node are associated with a second set of low power scheduling nodes, wherein the PRN partitions, or assigns different partitions of, at least one type of DMRS parameters to the first and the second set of low power scheduling nodes. Still an example is to form a first set of every other macro scheduling node in a heterogeneous network deployment and a second set of the remaining macro scheduling nodes, wherein all low power scheduling nodes in the coverage area of a macro scheduling node are then associated with a different set than the macro, that is, if the macro is associated with the first set all low power scheduling nodes in the coverage area of the macro are associated to the second set. Such a selection of sets may be beneficial if there is little inter-low-power-scheduling-node-interference and the major interference in the network suffered by UEs served by low power scheduling nodes is due to UEs served by macro scheduling nodes.

In a scenario where the same CSH pattern is assigned to UEs of all the scheduling nodes with which the RPN is associated, different BSIs are assigned to UEs of individual scheduling nodes with which the RPN is associated, and the SGH is disabled for UEs of all the scheduling nodes with which the RPN is associated, then DMRS orthogonality may be achieved by limiting UEs associated to one scheduling node to use one specific OCC. UEs in the coordinated area, i.e. UEs served by scheduling nodes associated with the RPN, using one OCC will then generate and transmit DMRSs that are orthogonal to the DMRSs of UEs in the coordinated area using the other OCC for generation and transmission of DMRSs.

In FIG. 4a, the RPN 400 is also illustrated comprising a receiving unit 401 and a transmitting unit 402. Through these two units, the RPN 400 is adapted to communicate with other nodes and/or entities in the wireless communication network. The receiving unit 401 may comprise more than one receiving arrangement. For example, the receiving unit may be connected to both a wire and an antenna, by means of which the RPN 400 is enabled to communicate with other nodes and/or entities in the wireless communication network. Similarly, the transmitting unit 402 may comprise more than one transmitting arrangement, which in turn are connected to both a wire and an antenna, by means of which the RPN 400 is enabled to communicate with other nodes and/or entities in the wireless communication network. The RPN 400 further comprises a memory 403 for storing data. Further, the RPN 400 is illustrated comprising a control or processing unit 408 which in turns is connected to the different units 404-407. It shall be pointed out that this is merely an illustrative example and the RPN 400 may comprise more, less or other units or modules which execute the functions of the RPN 400 in the same manner as the units illustrated in FIG. 4a.

It should be noted that FIG. 4a merely illustrates various functional units in the RPN 400 in a logical sense. The functions in practice may be implemented using any suitable software and hardware means/circuits etc. Thus, the embodiments are generally not limited to the shown structures of the RPN 400 and the functional units. Hence, the previously described exemplary embodiments may be realised in many ways. For example, one embodiment includes a computer-readable medium having instructions stored thereon that are executable by the control or processing unit 408 for executing the method steps in the RPN 400. The instructions executable by the computing system and stored on the computer-readable medium perform the method steps of the RPN 400 as set forth in the claims.

In FIG. 5, the scheduling node 510 is also illustrated comprising a receiving unit 511 and a transmitting unit 512. Through these two units, the scheduling node 510 is adapted to communicate with other nodes and/or entities in the wireless communication network. The receiving unit 511 may comprise more than one receiving arrangement. For example, the receiving unit may be connected to both a wire and an antenna, by means of which the scheduling node 510 is enabled to communicate with other nodes and/or entities in the wireless communication network. Similarly, the transmitting unit 512 may comprise more than one transmitting arrangement, which in turn are connected to both a wire and an antenna, by means of which the scheduling node 510 is enabled to communicate with other nodes and/or entities in the wireless communication network. The scheduling node 510 further comprises a memory 513 for storing data. Further, the scheduling node 510 is illustrated comprising a control or processing unit 517 which in turns is connected to the different units 514-516. It shall be pointed out that this is merely an illustrative example and the scheduling node 510 may comprise more, less or other units or modules which execute the functions of the scheduling node 510 in the same manner as the units illustrated in FIG. 5.

It should be noted that FIG. 5 merely illustrates various functional units in the scheduling node 510 in a logical sense. The functions in practice may be implemented using any suitable software and hardware means/circuits etc. Thus, the embodiments are generally not limited to the shown structures of the scheduling node 510 and the functional units. Hence, the previously described exemplary embodiments may be realised in many ways. For example, one embodiment includes a computer-readable medium having instructions stored thereon that are executable by the control or processing unit 517 for executing the method steps in the scheduling node 510. The instructions executable by the computing system and stored on the computer-readable medium perform the method steps of the scheduling node 510 as set forth in the claims.

Figure 6:
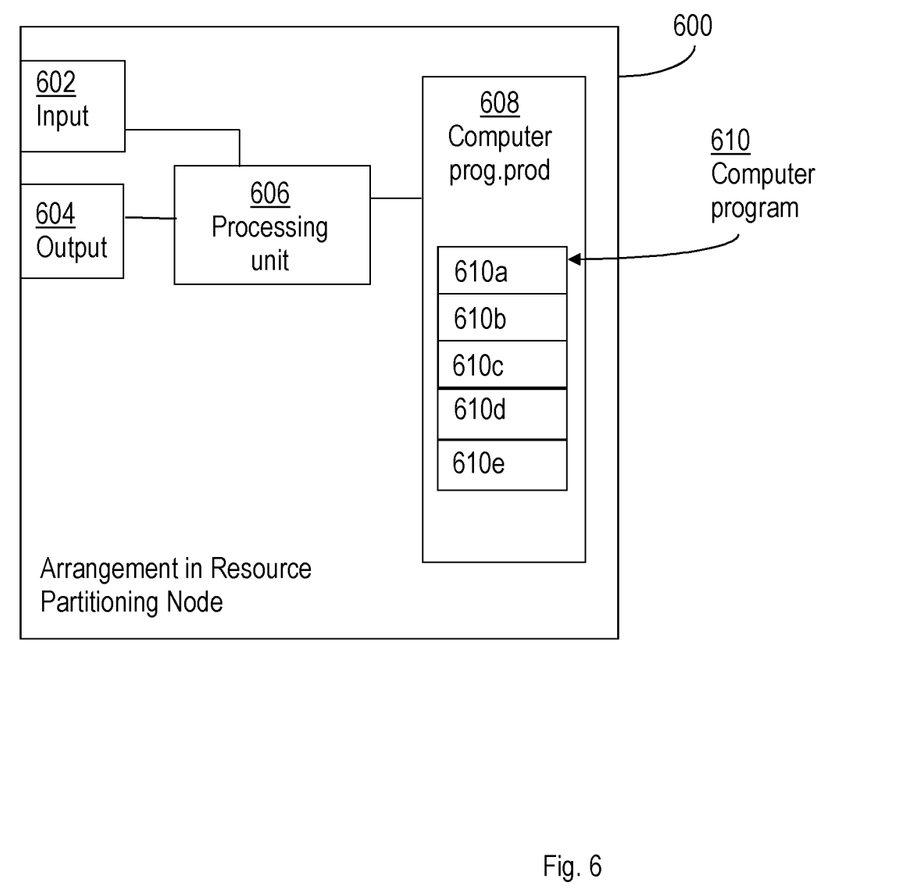
FIG. 6 is a block diagram of an arrangement in an RPN according to an exemplifying embodiment.

FIG. 6 schematically shows an embodiment of an RPN 600. Comprised in the RPN 600 are here a processing unit 606, e.g. with a DSP (Digital Signal Processor). The processing unit 606 may be a single unit or a plurality of units to perform different actions of procedures described herein. The RPN 600 may also comprise an input unit 602 for receiving signals from other entities, and an output unit 604 for providing signal(s) to other entities. The input unit and the output unit may be arranged as an integrated entity or as illustrated in the example of FIG. 4a, as one or more interfaces 401/402.

Furthermore, the RPN 600 comprises at least one computer program product 608 in the form of a non-volatile memory, e.g. an EEPROM (Electrically Erasable Programmable Read-Only Memory), a flash memory and a hard drive. The computer program product 608 comprises a computer program 610, which comprises code means, which when executed in the processing unit 606 in the RPN 600 causes the RPN 600 to perform the actions e.g. of the procedure described earlier in conjunction with FIGS. 2a and 2b.

The computer program 610 may be configured as a computer program code structured in computer program modules 610a-610e. Hence, in an exemplifying embodiment, the code means in the computer program of the RPN 600 comprises an assigning unit, or module, for assigning a first partition of at least one type of DMRS parameters to the at least one UE of the first scheduling node and a second partition of the same type of DMRS parameters to the at least one UE of the second scheduling node. The computer program further comprises a signaling unit, or module, for signaling, to the first and the second scheduling node, the respective partition of the at least one type of DMRS parameters to be used by the respective at least one UE.

The computer program modules could essentially perform the actions of the flow illustrated in FIGS. 2a and 2b, to emulate the RPN 600. In other words, when the different computer program modules are executed in the processing unit 606, they may correspond to the units 404-407 of FIG. 4a.

Figure 7:
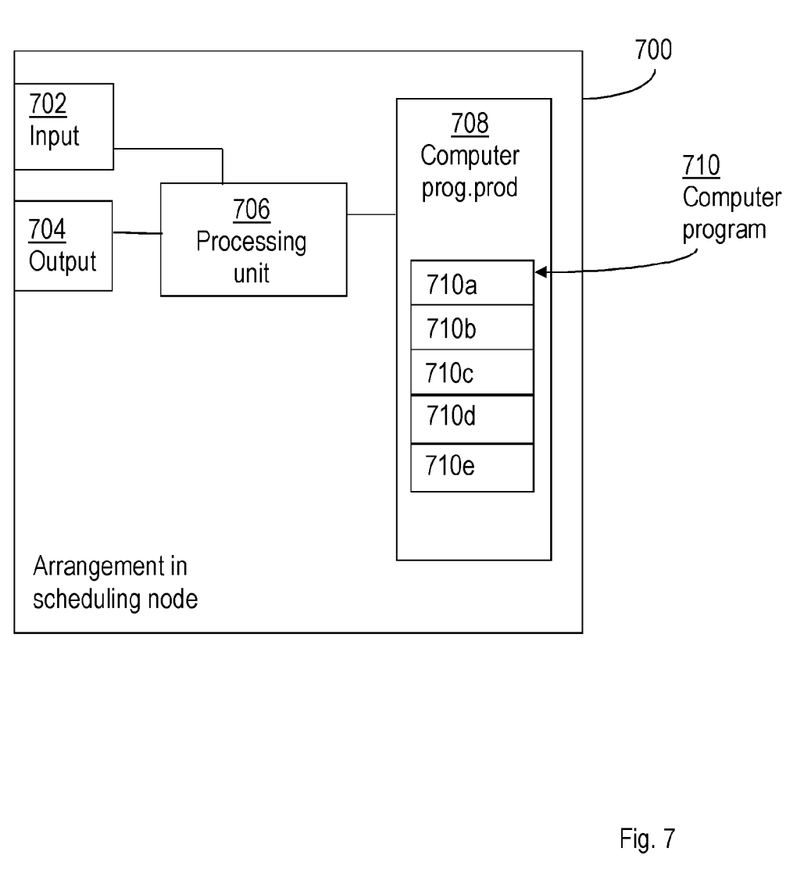
FIG. 7 is a block diagram of an arrangement in a scheduling node according to an exemplifying embodiment.

FIG. 7 schematically shows an embodiment of a scheduling node 700. Comprised in the scheduling node 700 are here a processing unit 706, e.g. with a DSP (Digital Signal Processor). The processing unit 706 may be a single unit or a plurality of units to perform different actions of procedures described herein. The scheduling node 700 may also comprise an input unit 702 for receiving signals from other entities, and an output unit 704 for providing signal(s) to other entities. The input unit and the output unit may be arranged as an integrated entity or as illustrated in the example of FIG. 5, as one or more interfaces 511/512.

Furthermore, the scheduling node 700 comprises at least one computer program product 708 in the form of a non-volatile memory, e.g. an EEPROM (Electrically Erasable Programmable Read-Only Memory), a flash memory and a hard drive. The computer program product 708 comprises a computer program 710, which comprises code means, which when executed in the processing unit 706 in the scheduling node 700 causes the scheduling node 700 to perform the actions e.g. of the procedure described earlier in conjunction with FIGS. 3*a* and 3*b*.

The computer program 710 may be configured as a computer program code structured in computer program modules 710*a*-710*e*. Hence, in an exemplifying embodiment, the code means in the computer program of the scheduling node 700 comprises a receiving unit, or module, for receiving, from an RPN, a partition of at least one type of DMRS parameters to be used by the at least one UE for configuring DMRSs. The computer program further comprises a signaling unit, or module, for signaling, to the at least one UE, a DMRS configuration associated with the received partition of the at least one type of DMRS parameters to be used for configuring DMRSs.

The computer program modules could essentially perform the actions of the flow illustrated in FIGS. 3*a* and 3*b*, to emulate the scheduling node 700. In other words, when the different computer program modules are executed in the processing unit 706, they may correspond to the units 514-516 of FIG. 5.

Although the code means in the respective embodiments disclosed above in conjunction with FIGS. 4*a* and 5 are implemented as computer program modules which when executed in the respective processing unit causes the RPN and the scheduling node respectively to perform the actions described above in the conjunction with figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the RPN and the scheduling node respectively.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method performed by a Resource Partitioning Node, RPN, associated with at least a first and a second scheduling node for allocating Demodulation Reference Signal, DMRS, parameters to at least one User Equipment, UE, of the first scheduling node and to at least one UE of the second scheduling node, the method comprising:
   assigning a first partition of at least one type of DMRS parameters to the at least one UE of the first scheduling node and a second partition of the same type of DMRS parameters to the at least one UE of the second scheduling node;
   signalling, to the first and the second scheduling nodes, the respective partition of the at least one type of DMRS parameter to be used by the respective at least one UE; and
   the assigning of the first and second partition of the at least one type of DMRS parameters to the respective UEs further comprising assigning different base sequence indices, BSIs, to the at least one UE of the first scheduling node and to the at least one UE of the second scheduling node.

2. The method according to claim 1, wherein the at least one type of DMRS parameters is comprised in a group consisting of Orthogonal Cover Code, OCC, Cyclic Shift, CS, Cyclic Shift Hopping pattern index, CSH, Base Sequence Index, BSI, and Sequence and Group Hopping, SGH.

3. The method according to claim 1, wherein assigning the first and second partition of the at least one type of DMRS parameters to the respective UEs comprises assigning a first Orthogonal Cover Code, OCC, to the at least one UE of the first scheduling node and a second OCC to the at least one UE of the second scheduling node, wherein the first and the second OCC are orthogonal.

4. The method according to claim 1, further comprising assigning the same Cyclic Shift Hopping pattern index, CSH, pattern to both the at least one UE of the first scheduling node and to the at least one UE of the second scheduling node.

5. The method according to claim 1, further comprising disabling Sequence and Group Hopping, SGH, for both the at least one UE of the first scheduling node and the at least one UE of the second scheduling node.

6. The method according to claim 1, further comprising forming at least two groups of UEs of the first scheduling node, wherein assigning the first and second partition of the at least one type of DMRS parameters to the respective UEs comprises assigning the first partition to one of the groups of UEs of the first scheduling node and assigning the second partition to the at least one UE of the second scheduling node, wherein at least the other one of the groups of UEs of the first scheduling node are assigned all available DMRS parameters of all available types.

7. The method according to claim 1, further comprising receiving Reference Signal Received Power, RSRP, reports from UEs of the first and the second scheduling nodes, wherein the assigning the first and second partition of the at least one type of DMRS parameters to the respective UEs is based on the received RSRP reports.

8. The method according to claim 1, wherein at least one scheduling node serves at least one Multiple Input Multiple Output, MIMO, UE transmitting with rank >2, wherein the RPN treats each MIMO UE transmitting with rank >2 separately when assigning the first and second partition of the at least one type of DMRS parameters to the respective UEs.

9. A Resource Partitioning Node, RPN, associated with at least a first and a second scheduling node configured to allocate Demodulation Reference Signal, DMRS, parameters to at least one User Equipment, UE, of the first scheduling node and to at least one UE of the second scheduling node, the RPN comprising:
    a processor coupled to a memory, the memory storing an assignment unit and a signalling unit;
    the assigning unit configured to assign a first partition of at least one type of DMRS parameters to the at least one UE of the first scheduling node and a second partition of the same type of DMRS parameters to the at least one UE of the second scheduling node;
    the signalling unit configured to signal, to the first and the second scheduling nodes, the respective partition of the at least one type of DMRS parameter to be used by the respective at least one UE; and
    the assigning unit is further configured to assign the first and second partition of the at least one type of DMRS parameters to the respective UEs further by assigning different base sequence indices, BSIs, to the at least one UE of the first scheduling node and to the at least one UE of the second scheduling node.

10. The RPN according to claim 9, wherein the at least one type of DMRS parameters is comprised in a group consisting of Orthogonal Cover Code, OCC, Cyclic Shift, CS, Cyclic Shift Hopping pattern index, CSH, Base Sequence Index, BSI, and Sequence and Group Hopping, SGH.

11. The RPN according to claim 9, wherein the assigning unit is configured to assign the first and second partition of the at least one type of DMRS parameters to the respective UEs by assigning a first Orthogonal Cover Code, OCC, to the at least one UE of the first scheduling node and a second OCC to the at least one UE of the second scheduling node, wherein the first and the second OCCs are orthogonal.

12. The RPN according to claim 9, wherein the assigning unit is further configured to assign the same Cyclic Shift Hopping pattern index, CSH, pattern to both the at least one UE of the first scheduling node and to the at least one UE of the second scheduling node.

13. The RPN according to claim 9, wherein the assigning unit is further configured to disable Sequence and Group Hopping, SGH, for both the at least one UE of the first scheduling node and the at least one UE of the second scheduling node.

14. The RPN according to claim 9, further comprising a group forming unit configured to form at least two groups of UEs of the first scheduling node, wherein the assigning unit is configured to assign the first and second partition of the at least one type of DMRS parameters to the respective UEs by assigning the first partition to one of the groups of UEs of the first scheduling node and assigning the second partition to the at least one UE of the second scheduling node, wherein the assigning unit is configured to assign, to at least the other one of the groups of UEs of the first scheduling node, all available DMRS parameters of all available types.

15. The RPN according to claim 9, further comprising a receiving unit configured to receive Reference Signal Received Power, RSRP, reports from UEs of the first and the second scheduling nodes, wherein the assigning unit is configured to assign the first and second partition of the at least one type of DMRS parameters to the respective UEs is based on the received RSRP reports.

16. The RPN according to claim 9, wherein at least one scheduling node serves at least one Multiple Input Multiple Output, MIMO UE transmitting with rank >2, wherein the RPN is configured to treat each MIMO UE transmitting with rank >2 separately when the assigning unit assigns the first and second partition of the at least one type of DMRS parameters to the respective UEs.

17. A computer memory, storing computer readable code, which when run in a processing unit comprised in an arrangement in a Resource Partitioning Node associated with at least a first and a second scheduling node for allocating Demodulation Reference Signal, DMRS, parameters to at least one User Equipment, UE, of the first scheduling node and to at least one UE of the second scheduling node, causes the Resource Partitioning Node to:
    assign a first partition of at least one type of DMRS parameters to the at least one UE of the first scheduling node and a second partition of the same type of DMRS parameters to the at least one UE of the second scheduling node;
    signal, to the first and the second scheduling nodes, the respective partition of the at least one type of DMRS parameter to be used by the respective at least one UE; and
    the assigning of the first and second partition of the at least one type of DMRS parameters to the respective UEs further comprising assigning different base sequence indices, BSIs, to the at least one UE of the first scheduling node and to the at least one UE of the second scheduling node.

* * * * *